United States Patent [19]
Mizukami

[11] Patent Number: 5,242,728
[45] Date of Patent: Sep. 7, 1993

[54] MAGNETIC RECORDING MEDIUM
[75] Inventor: Makoto Mizukami, Yokosuka, Japan
[73] Assignee: Victor Company of Japan, Ltd., Yokohama, Japan
[21] Appl. No.: 618,252
[22] Filed: Nov. 21, 1990
[30] Foreign Application Priority Data
Nov. 21, 1989 [JP] Japan .................... 1-302362
[51] Int. Cl.⁵ ............................. G11B 5/00
[52] U.S. Cl. ................... 428/64; 428/668; 428/694; 428/900
[58] Field of Search ........... 428/694, 900, 668, 651, 428/652, 660, 663, 64, 65; 427/128, 129, 132; 204/192.2

[56] References Cited
U.S. PATENT DOCUMENTS

| | | | |
|---|---|---|---|
| 4,410,406 | 10/1983 | Kohmoto et al. | 204/192 M |
| 4,418,126 | 11/1983 | Izumi et al. | 428/694 |
| 4,631,202 | 12/1986 | Opfer et al. | 427/131 |
| 4,749,459 | 6/1988 | Yamashita et al. | 204/192.15 |
| 4,902,583 | 2/1990 | Brucker et al. | 428/665 |

Primary Examiner—Paul J. Thibodeau
Assistant Examiner—Stevan A. Resan
Attorney, Agent, or Firm—Jacobson, Price, Holman & Stern

[57] ABSTRACT

A magnetic recording medium includes a primary coat formed on a non-magnetic base and a magnetic film of a CoP alloy formed on the primary coat, wherein the primary coat is a metal simple substance selected from the group of Cr, V and W or an alloy of two or more of them, and the magnetic film is at least one of the CoP alloys represented by the following formulae, wherein X, Y, Z, a and b denote atomic percent (at %):

$$Co_X P_Y Pt_Z$$

where Y and Z denote $4 \leq Y \leq 11$, and $2 \leq Z \leq 10$, respectively, with the balance being X;

$$Co_X P_Y Pt_Z Ni_a$$

where Y, Z and a denote $5 \leq Y \leq 9$, $2 \leq Z \leq 10$ and $5 \leq a \leq 35$, respectively, with the balance being X; and $$Co_X P_Y Pt_Z Ni_a Cr_b$$

where Y, Z and a and b denote $5 \leq Y \leq 9$, $2 \leq Z \leq 10$, $5 \leq a \leq 35$ and $0 < b \leq 17$, respectively, with the balance being X.

2 Claims, 7 Drawing Sheets

MAGNETIC RECORDING MEDIUM

BACKGROUND OF THE INVENTION

The present invention relates to a magnetic recording medium which employs a CoP alloy as a magnetic film.

There have hitherto been proposed magnetic recording media in which a primary coat comprising Cr or the like is formed on a non-magnetic substrate such as plastics, for example, polyesters, polyamides, polyimides, or aluminum, and a magnetic film comprising a CoP alloy is then formed.

As for the primary coat of the magnetic film which is formed by the sputtering of a CoP alloy or a CoNiP alloy, for example Japanese Patent Laid-Open Publication No. 77024/1983 discloses the use of Al, Cr or Ti as the primary coat, and Japanese Patent Laid-Open Publication No. 77027/1983 discloses the use of a Cr alloy which contains 60% by weight or less of one of Mo, Ti, Fe, Co and Ni.

As for the magnetic film itself formed by the sputtering of the CoP alloy or the CoNiP alloy, it has also been reported that when a CoNiP teralloy or a CoNiPCr tetralloy are used as a magnetic material, the s/N ratio can be increased and the noise can be decreased in comparison with P-free alloys such as CoNi or CoNiCr (KUBOTA GIHO, No. 20, pp. 19–23 (April, 1988)).

Also, Japanese Patent Laid-Open Publication No. 116707/1983 discloses the magnetic films comprising CoP alloys or CoNiP alloys having a percentage composition of P in the range of 6–8% by weight.

On the other hand, magnetic films containing Pt such as a CoPt alloy or the like have also been applied to magnetic media such as magnetic disks or the like.

However, the magnetic recording media described in the aforementioned publications as well as other conventional magnetic recording media have a coercive force $H_c$ of at most about 1200 oersteds, and the heating of a non-magnetic base to 200° C. or more or the addition of Pt in an amount of up to 15 at % to a Co alloy are required in order to obtain the coercive force $H_c$ of 1200 oersteds or more. If these requirements are satisfied, some of the non-magnetic bases are restricted by their heat-resistant temperature or the magnetic recording materials become expensive because of the use of Pt in a large amount, so that magnetic recording materials for practical use have not been proposed from the standpoint of their costs.

As described above, there was hitherto no such magnetic recording medium wherein a non-magnetic base requires heating to a temperature of less than 200° C., retains coercive force $H_c$ of 1200 oersteds or more and has a low noise on regeneration even if Pt to be added to the Co alloy film is decreased to an amount of 10 at % or less from the standpoint of the cost. Recently, it is expected to supply such magnetic recording mediums with the improvement or low-gapping of a head of magnetic disks.

BRIEF SUMMARY OF THE INVENTION

It is an object of this invention to provide a magnetic recording medium which overcomes the problems described above. The present invention achieves this objective by providing a magnetic recording medium constructed by using as a primary cost a metal simple substance selected from Cr, V and W or an alloy of two or more of these metals and as a CoP alloy one selected from $Co_xP_yPt_z$, wherein X, Y and Z independently denote the atomic percent (at %) in the range of $4 \leq Y \leq 11$ and $2 \leq Z \leq 10$ with the balance of X, $Co_xP_yPt_zNi_a$, wherein X, Y, Z and a independently denote the at % in the range of $5 \leq Y \leq 9, 2 \leq Z \leq 10$ and $5 \leq a\ 35$ with the balance of X, and $Co_xP_yPt_zNi_aCr_b$, wherein X, Y, Z, a and b independently denote the at % in the range of $5 \leq Y \leq 9, 2 \leq Z \leq 10, 5a \leq 35, 0 < b \leq 17$ with the balance of X, and forming the primary coat and the CoP alloy as a magnetic film in this sequence on the non-magnetic base.

The magnetic recording medium having the above-described construction according to the present invention is prepared by subjecting a non-magnetic base such as aluminum or the like to texture treatment and surface treatment such as washing or the like before the thus treated surface is coated with a primary coat, the vacuum deposition method, the sputtering method or the like, and then the CoP alloy is sputtered by the RF sputtering with use of an inert gas such as Ar or like as an ion source for impact ion, the DC sputtering or the magnetron sputtering such as the DC magnetron sputtering. Thus, the CoP alloy forms the magnetic film, which is supported by the non-magnetic base, so that adhesion properties between the non-magnetic base and the magnetic film and particularly in the present invention the surface properties of the magnetic film are improved and the coercive force $H_c$ of the magnetic recording medium and the electromagnetic conversion properties are also improved by the limited combination of the material of the primary coat and the alloy composition of the magnetic film.

DETAILED DESCRIPTION OF THE INVENTION

Figure 1:
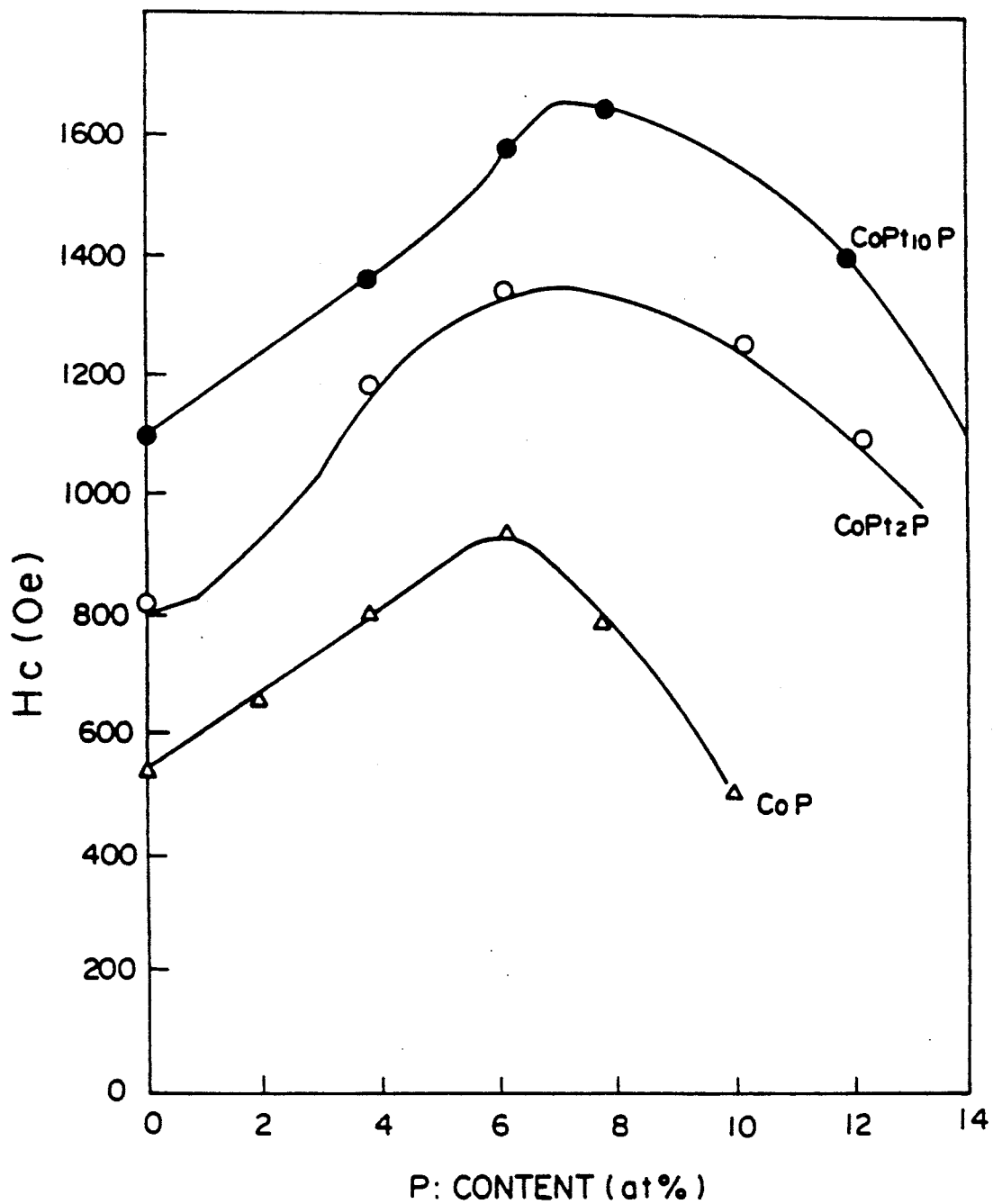
FIG. 1 is a graph which demonstrates the relationship between the content of P in terms of a parameter of the Pt content in the magnetic film of the magnetic recording medium in which a CoPPt teralloy magnetic film is formed on the Cr primary coat according to the present invention by sputtering and the coercive force $H_c$.

The present invention is further described in detail with reference to preferred embodiments shown in the accompanying drawings.

PREPARATION OF MAGNETIC RECORDING MEDIA

Magnetic recording media used in Examples 1–24 and the Comparative Example were prepared by plating an aluminum plate as a non-magnetic base with a NiP alloy, forming in sequence a primary layer and a magnetic film comprising a CoP alloy on the texture treated surface of the non-magnetic base of which the NiP surface had been texture treated by the DC magnetron sputtering method with a target of 6" $\phi$ in the following procedures. The conditions for forming the films in respective Examples are as follows.

EXAMPLE 1

A non-magnetic base was placed in a vacuum chamber, while Pt was arranged therein on a Co target in such a manner as the Pt content was 2 at %. Various numbers of $Co_4P_3$ chips were placed on the Co target. After the air in the chamber was evacuated to the ultimate vacuum of $2 \times 10^{-6}$ Torr and the non-magnetic base was heated to 200° C., Cr having a thickness of 1000 Å was formed into film on the texture treated surface of the non-magnetic base by sputtering under Ar gas pressure of $5 \times 10^{-3}$ Torr.

Then, sputtering of CoP alloys was conducted under Ar gas pressure of $5 \times 10^{-3}$ Torr to form magnetic films comprising the various CoP alloys having a thickness of 500 Å of $Co_{98-x}Pt_2P_x$ types and thus to obtain the magnetic recording media.

EXAMPLE 2

Example 1 was repeated except that the amount of Pt was 10 at % to obtain the magnetic recording media.

EXAMPLE 3

Example 1 was repeated except after the Cr primary coat having a thickness of 1000 Å was formed in the same manner as in Example 1, various amounts of Pt, Ni and $Co_4P_3$ were arranged on the Co target, and magnetic films comprising various CoP alloys of $Co_{90.2-x}Ni_xPt_{3.7}P_{6.1}$ type were formed to give the magnetic recording media of Example 3 having various amounts of Ni.

EXAMPLE 4

In the same manner as in Example 3, after the Cr primary coat having a thickness of 1000 Å had been formed, various amounts of Pt, Ni and $Co_4P_3$ were arranged on the Co target, and magnetic films comprising CoP alloys of $Co_{89.9-x}Ni_{6.4}Pt_{3.7}P_x$ type were formed to give the magnetic recording media of Example 4 having various amounts of P.

EXAMPLE 5

In the same manner as in Example 3, after the Cr primary coat having a thickness of 1000 Å had been formed, various amounts of Pt, Ni and $Co_4P_3$ were arranged on the Co target, and magnetic films comprising CoP alloys of $Co_{87.5-x}Ni_{6.4}Pt_xP_{6.1}$ type were formed to give the magnetic recording media of Example 5 having various amounts of P.

EXAMPLE 6

Example 3 was repeated except after the Cr primary coats having a thickness of 1000 Å and 2000 Å, respectively, had been formed, Cr was additionally arranged on the Co target and that the amounts of Pt, Ni, $Co_4P_3$ and Cr were varied. Thus, magnetic films comprising various CoP alloys of $Co_{70.8-x}Ni_xPt_{19.4}Pt_{3.7}P_{6.1}Cr_x$ type were formed to give the magnetic recording media of Example 6 having various amounts of Cr.

EXAMPLE 7

Example 6 was repeated except that the base stoving temperature was varied and the Ar gas pressure was set at $10 \times 10^{-3}$ Torr, and thus the magnetic recording medium of Example 7 having a magnetic film comprising $Co_{67.7}Ni_{19.4}Pt_{3.7}P_{6.1}Cr_{3.1}$.

EXAMPLE 8

The Cr primary coat having a thickness of 2,000 Å was formed on a 3.5 inch disk base in the same manner as in Example 6, and then the magnetic recording medium (disk) of Example 8 which comprises a magnetic film of $Co_{67.7}Ni_{19.4}Pt_{3.7}P_{6.1}Cr_{3.1}$ having a thickness of 500 Å was obtained.

EXAMPLES 9–16

Magnetic recording media of Examples 9–16 were obtained in the same manner as in Examples 1–8 except that Cr as the primary coat was replaced with V.

EXAMPLES 17–24

Magnetic recording media of Examples 17–24 were obtained in the same manner as in Examples 1–8 except that Cr as the primary coat was replaced with W.

COMPARATIVE EXAMPLE 1

A magnetic recording medium of Comparative Example 1 was obtained in the same manner as in Example 1 except that Pt was removed during the process of forming a magnetic film comprising a CoP alloy.

COMPARATIVE EXAMPLE 2

$CoCr_{11.5}Ta_4$ having a thickness of 500 Å was formed into film by sputtering on the Cr primary coat having a thickness of 1000 Å under the Ar gas pressure of $5 \times 10^{-3}$ Torr. The base stoving temperature was varied as in Example 7.

EVALUATION OF MAGNETIC RECORDING MEDIA (a) The coercive force $H_c$ as a function of the content of P in the magnetic films comprising CoP alloys in the magnetic recording media of Examples 1 and 2 and Comparative Example 1 was measured. The results are shown in FIG. 1.

It is found from the results shown in FIG. 1 that coercive force $H_c$ is improved in proportion to the content of Pt in the range of 0–10 at % and an excellent magnetic recording medium of Example 2, as compared with that of Comparative Example 1, having a coercive force $H_c$ of more than 1200 oersteds is obtained at a content of P in the range of 4-11 at %, even if the content of Pt is kept so low as 2 at %.

(b) The coercive force $H_c$ as a function of the content of Ni in the magnetic film comprising a CoP alloy in the magnetic recording media of Example 3 was measured. The results are shown in FIG. 2.

Figure 2:
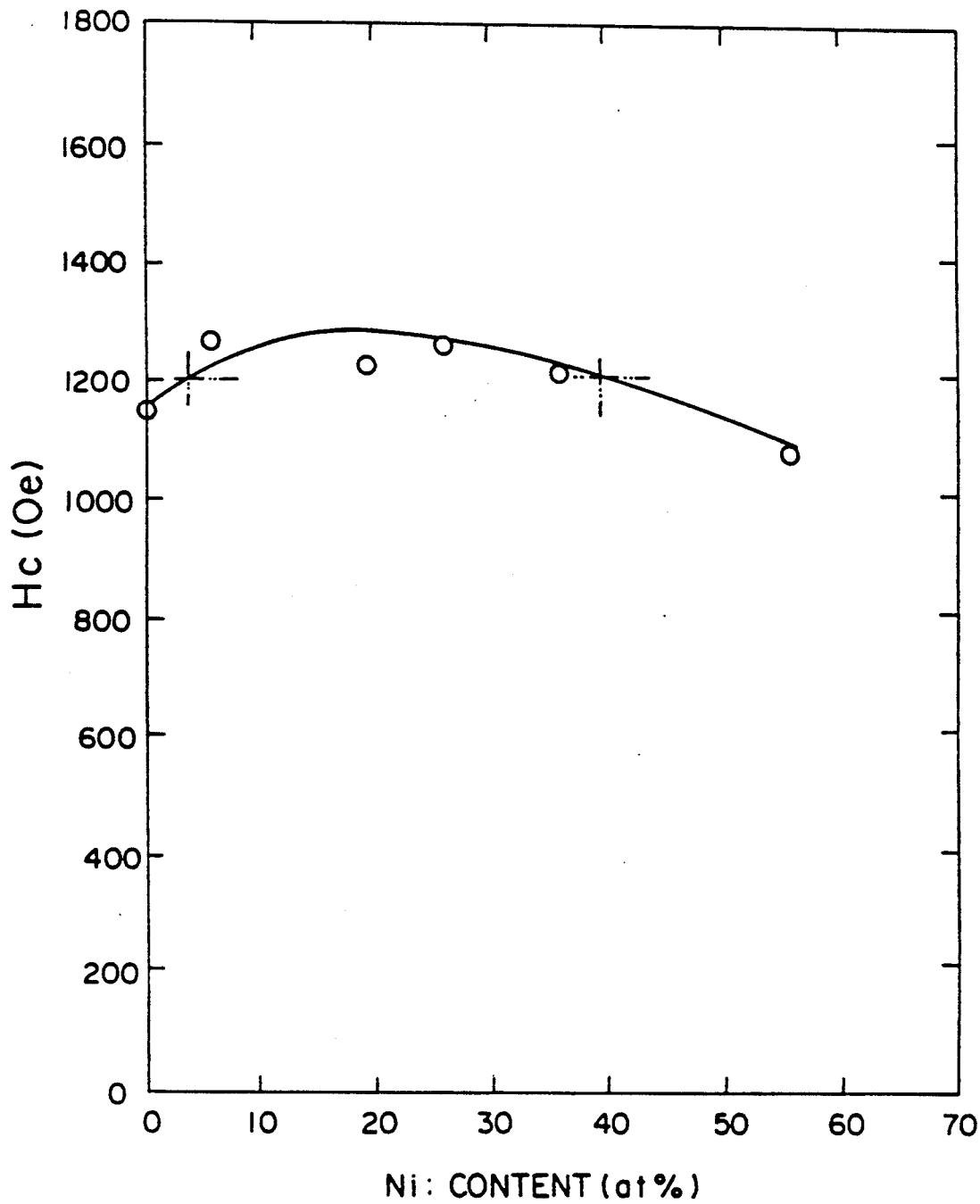
FIG. 2 is a graph which demonstrates the relationship between the content of Ni in the magnetic film of the magnetic recording medium in which a CoPPtNi tetralloy magnetic film is formed on the Cr primary coat according to the present invention by sputtering and the coercive force $H_c$.

It is found from the results shown in FIG. 2 that coercive force $H_c$ of the magnetic recording medium of Example 3 exceeds 1200 oersteds at the content of Ni in the range of 5-35 at % and thus an excellent magnetic recording medium is obtained under these compositions.

(c) The coercive force $H_c$ as a function of the content of P in the magnetic film Comprising a CoP alloy in the magnetic recording media of Example 4 was measured. The results are shown in FIG. 3.

Figure 3:
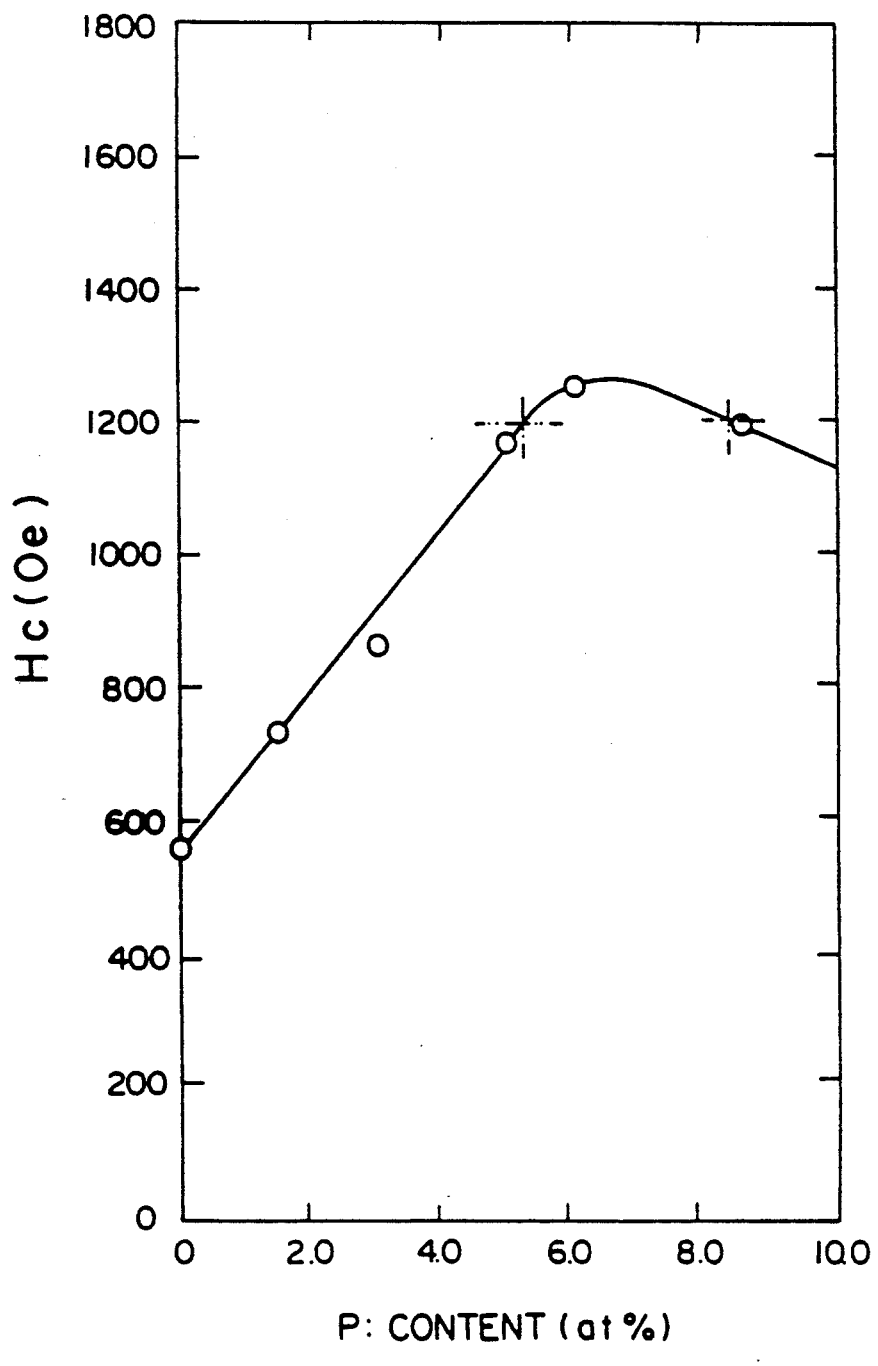
FIG. 3 is a graph which demonstrates the relationship between the content of P in the magnetic film of a magnetic recording medium in which a CoP alloy magnetic film is formed on the same primary coat as the one in FIG. 2 and the coercive force $H_c$.

It is found from the results shown in FIG. 3 that coercive force $H_c$ of the magnetic recording medium of Example 4 exceeds 1200 oersteds at the content of P in the range of 5-9 at % and thus an excellent magnetic recording medium is obtained under these compositions.

(d) The coercive force $H_c$ as a function of the content of Pt in the magnetic film comprising a CoP alloy in the magnetic recording media of Example 5 was measured. The results are shown in FIG. 4.

Figure 4:
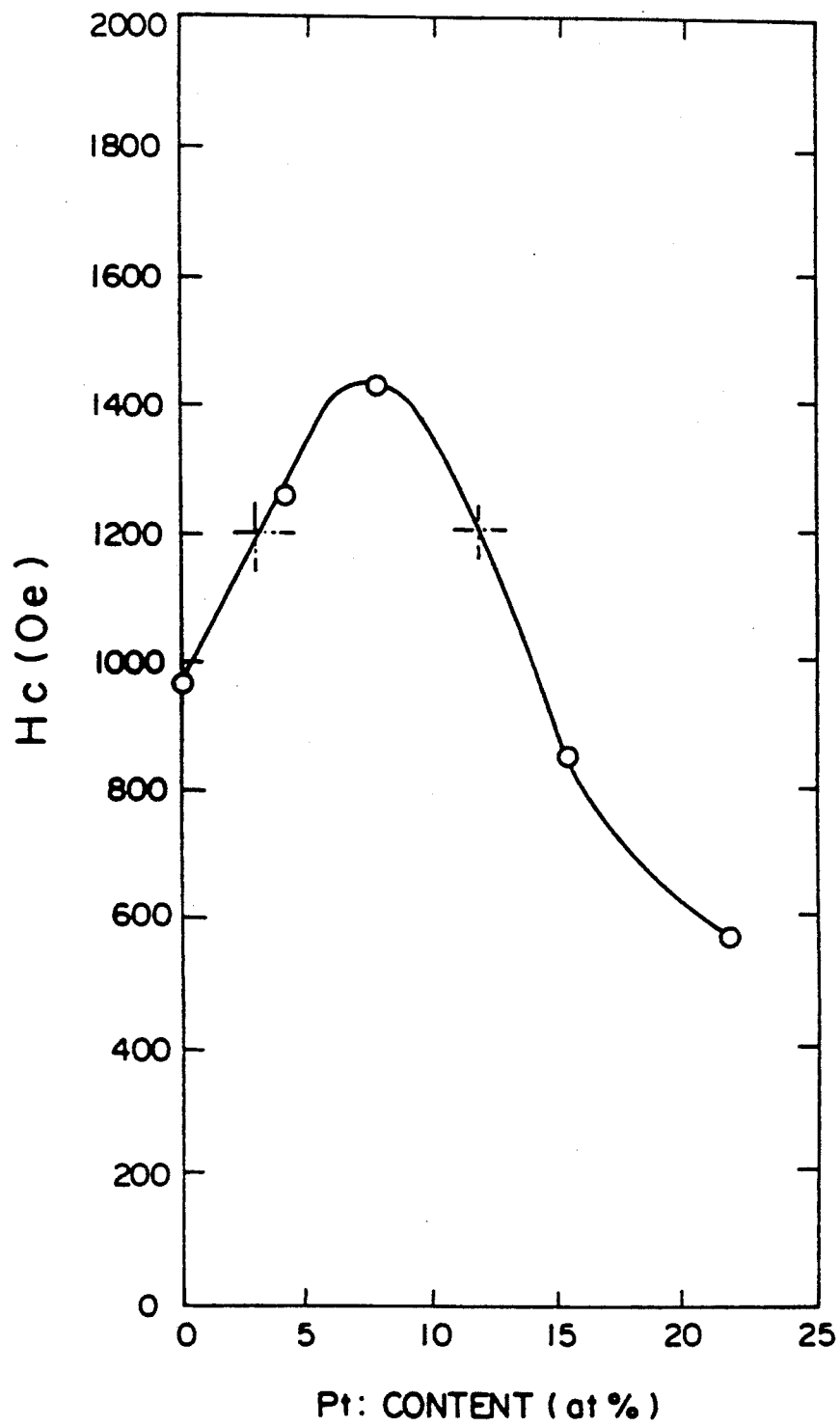
FIG. 4 is a graph which demonstrates the relationship between the content of Pt in the magnetic film of a magnetic recording medium in which a CoP alloy magnetic film is formed on the same primary coat as the one in FIGS. 2 and 3 and the coercive force $H_c$.

It is found from the results shown in FIG. 4 that coercive force $H_c$ of the magnetic recording medium of Example 5 exceeds 1200 oersteds at the content of Pt in the range of 2-11.5 at % and thus an excellent magnetic recording medium is obtained under these compositions.

(e) The coercive force $H_c$ and the saturated magnetization $M_s$ as a function of the content of Cr in the magnetic film comprising a CoP alloy in the magnetic recording media of Example 6 was measured. The results are shown in FIG. 5.

Figure 5A:
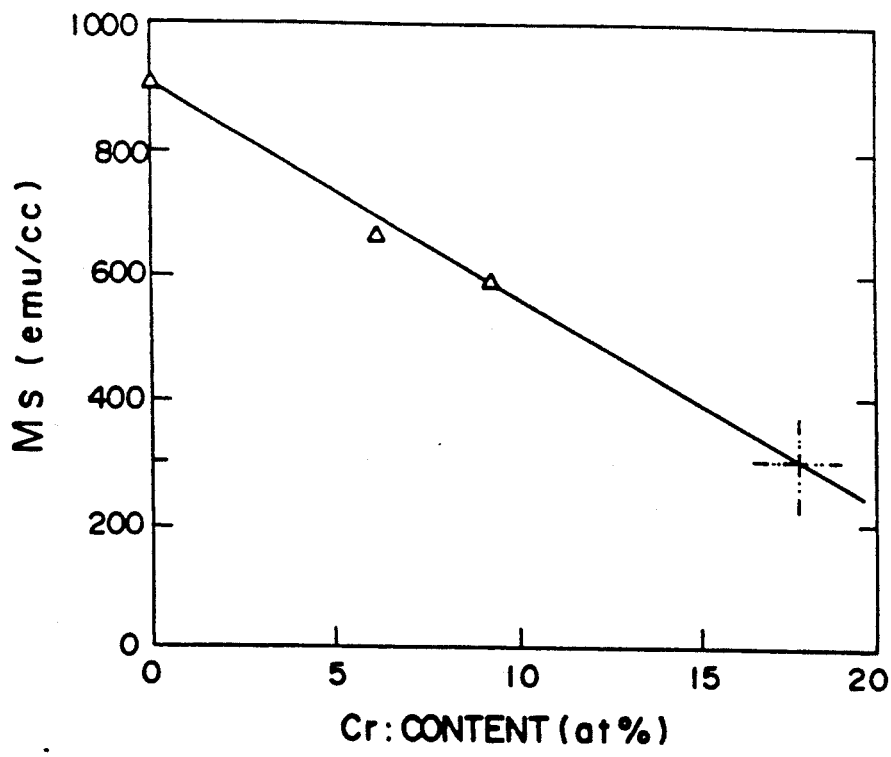
FIG. 5A and FIG. 5B show graphs which demonstrate the relationship between the content of Cr in the magnetic film of the magnetic recording medium in which the CoPPtNiCr pentalloy magnetic film is formed on the Cr primary coat according to the present invention and the coercive force $H_c$ and the saturated magnetization $M_s$.
Figure 5B:
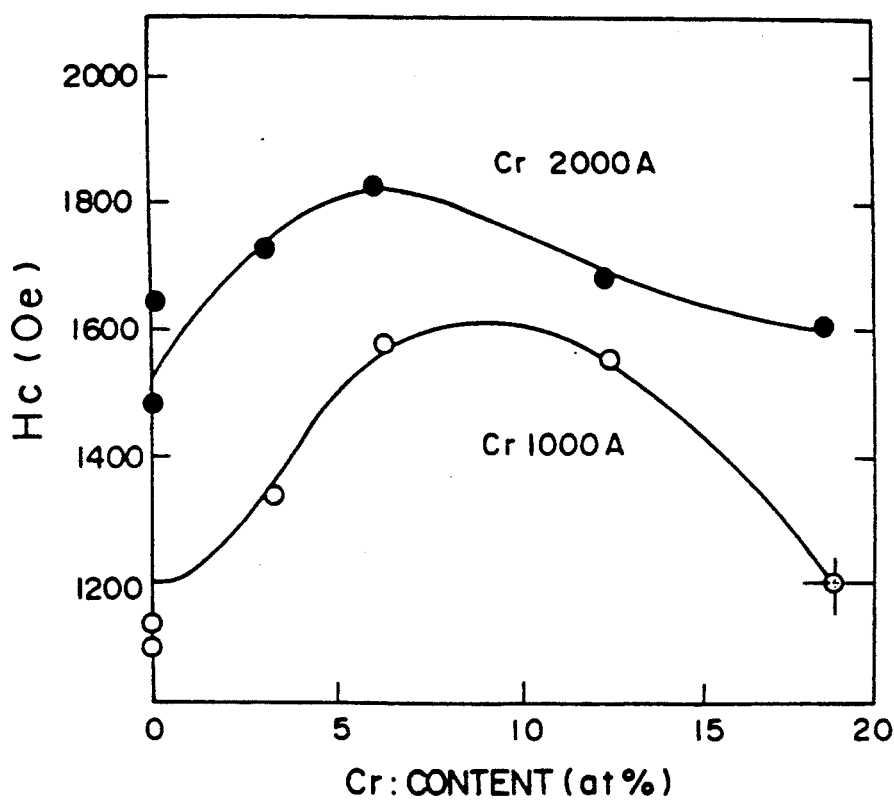

It is found from the results shown in FIG. 5 that the saturated magnetization $M_s$ of the magnetic recording medium in Example 6 decreases along with the increase of the Cr content of the CoP alloy and is less than 300 emu/cc if the Cr content exceeds 17 at %.

On the other hand, the coercive force $H_c$ exceeds 1200 oersteds at the Cr content in the range of 18 at % or less even if the Cr primary coat has a thickness of 1000 Å.

Therefore, it is found that a magnetic recording medium having preferable $M_s$ and $H_c$ is obtained when the Cr content of the CoP alloy is in the range of 17 at % or less.

(f) The coercive force $H_c$ as a function of the stoving temperature of the base in each of the two magnetic recording media in Example 7 and of a magnetic recording medium of which the magnetic film comprised a CoCrTa layer of Comparative Example 2 was measured. The results are shown in FIG. 6.

Figure 6:
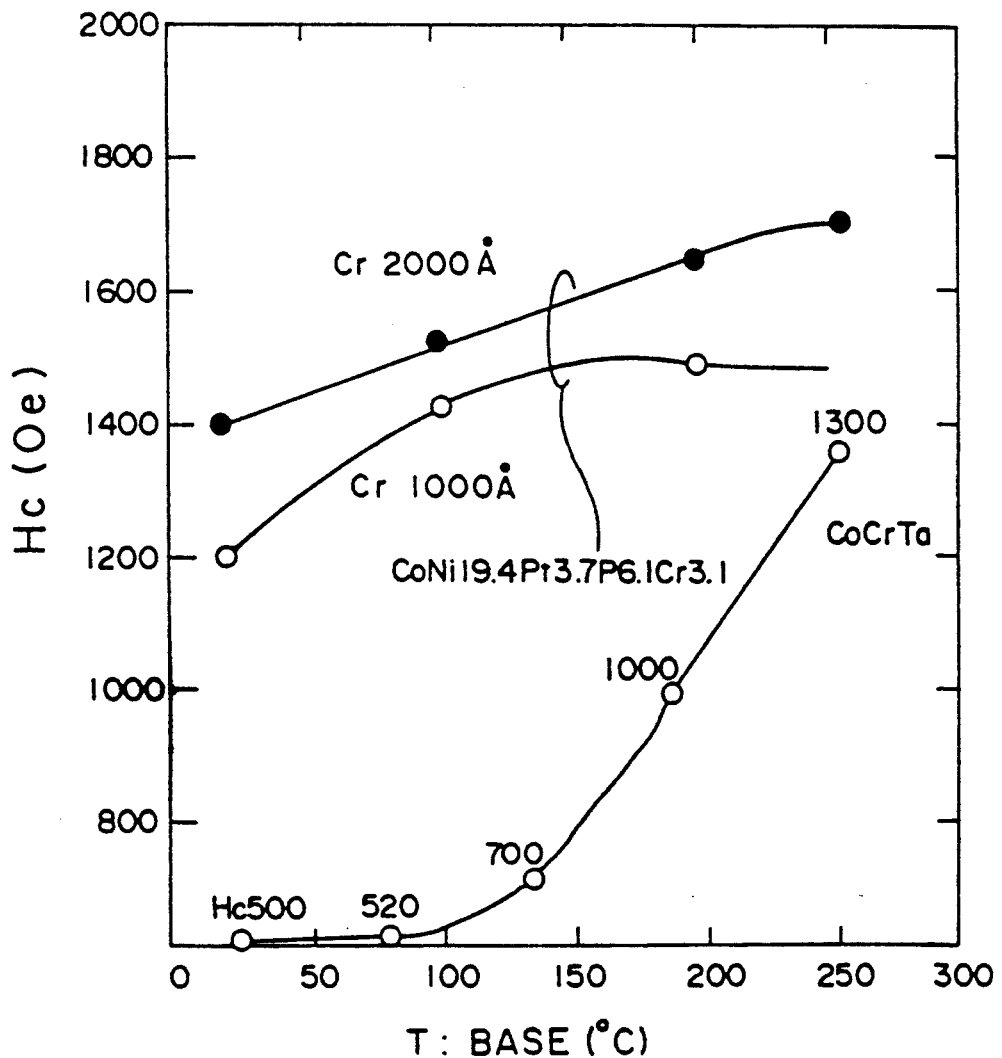
FIG. 6 is a graph which demonstrates the relationship between the base temperature and the coercive force $H_c$ on the formation of primary coats and magnetic films in a conventional magnetic recording medium in which a CoCrTa alloy is used as a magnetic film and in the magnetic recording media in which a CoP alloy magnetic film is formed on the same primary coat as in FIG. 5.

It is found from the results shown in FIG. 6 that while $H_c$ increases in proportion to the stoving temperature of the base in the conventional magnetic recording medium of which the magnetic film comprised a conventional CoCrTa layer, $H_c$ does not reach 1200 oersteds unless the stoving temperature of the base exceeds 225° C. On the contrary, $H_c$ reaches 1200 oersteds or more in either of the magnetic recording media in Example 7 which comprise a primary coat having a thickness of 1000 Å and 2000 Å, respectively, even if the base remains at an ambient temperature.

(g) The frequency characteristic of the regenerative output was measured with an electromagnetic conversion property analyzer for the two disks in Example 8, one of which had a CoCrTa layer formed at the base stoving temperature of 200° C. in Comparative Example 2 in place of the intact magnetic film. The results are shown in FIG. 7.

The head used was an MIG head of 3370 type, which was set as follows: F.H=0.20 μm, gap length=0.40 μm, $T_w$=15 μm, linear velocity=6.1 m/s, and recording frequency=6 MHz.

Figure 7:
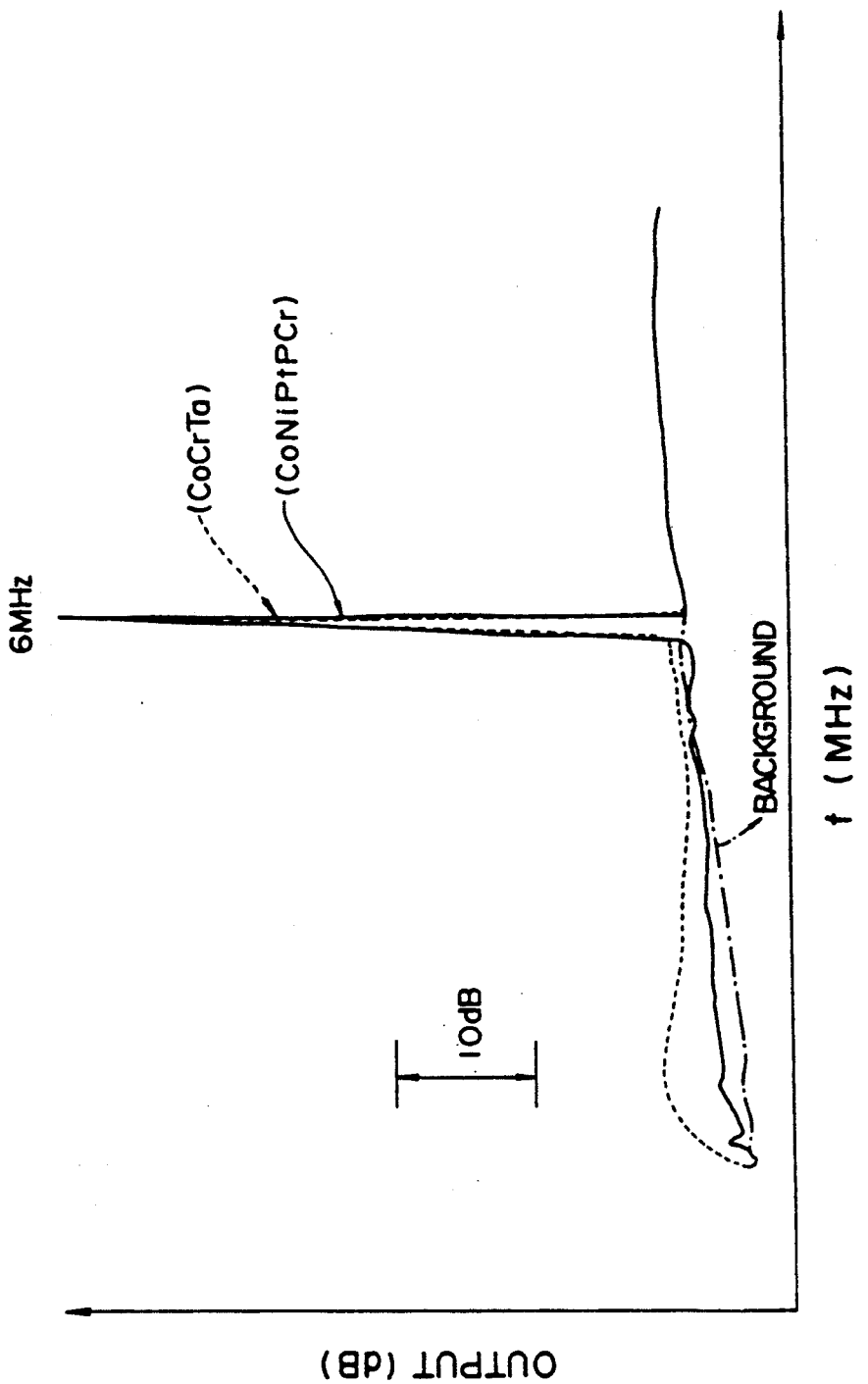
FIG. 7 is a graph which demonstrates the frequency characteristic of the regenerative output of the two magnetic recording media in FIG. 6.

It is found from the result shown in FIG. 7 that the noise of regenerative output, particularly at a lower frequency generated from the disk in Example 8 is lower than that generated from a conventional disk which used CoCrTa as the magnetic film, and the regenerative output at 6 MHz was 10 mV for the disk in Example 8 and 7.5 mV for the conventional disk, so that the disk in Example 8 can generate a larger output than the conventional disk.

(h) Evaluation in (a)14 (g) was repeated with use of the magnetic recording media in Examples 9-16 and 17-24 in place of those in Examples 1-8.

As a result, the magnetic recording media in Examples 9-24 wherein the primary coat V or W was used in place of the primary coat Cr of the magnetic recording media in Examples 1-8 gave similar results to those with the latter media.

As apparent from the Examples, according to the present invention, the coercive force $H_c$ reaches 1200 oersteds or more for the magnetic recording medium wherein a primary coat comprising one of Cr, V and W and a teralloy magnetic film $Co_XP_YPt_Z$ are formed in this sequence, if X, Y and Z are defined as $4 \leq Y \leq 11$ and $2 \leq Z \leq 10$ with the balance of X in terms of at %.

In the case of the magnetic recording medium in which a $Co_XP_YPt_ZNi_a$ tetralloy magnetic film is formed on the Cr primary coat, the coercive force $H_c$ reaches 1200 oersteds or more, if X, Y and Z are defined as $5 \leq Y \leq 9$, $2 \leq Z \leq 10$ and $5 \leq a \leq 35$ with the balance of X in terms of at %.

Also in the case of the magnetic recording medium in which a $Co_XP_YPt_ZNi_aCr_b$ pentalloy magnetic film is formed on the Cr primary coat, the saturated magnetization $M_s$ is so high as 300 emu/cc or more and the coercive force $H_c$ reaches 1200 oersteds or more, if X, Y, Z, a and b are defined as $5 \leq Y \leq 9$, $2 \leq Z \leq 10$, $5 \leq a \leq 35$, $0 < b \leq 17$ with the balance of X in terms of at %.

Furthermore, as apparent from the evaluation of the coercive force $H_c$ of the magnetic recording medium in Example 7, the coercive force $H_c$ of the magnetic recording medium which has been prepared with the base at an ambient temperature reaches 1200 oersteds or more according to the present invention.

In addition, as apparent from the evaluation of noise in the regenerative output of the magnetic recording medium of Example 8 and of the conventional magnetic recording medium which used a CoCrTa magnetic film, according to the present invention, noise, particularly at lower frequency, are low, and thus a magnetic recording medium having a high regenerative output is obtained.

I claim:

1. A magnetic recording medium comprising:

a non-magnetic base having a texture treated surface formed by roughening the surface of the non-magnetic base;

a primary coat formed on said texture treated surface of said non-magnetic base; and a magnetic film comprising a CoP alloy formed on said primary coat, wherein said primary coat comprises a metal selected from the group consisting of Cr, V, W and alloys of at least two of said metals, and said magnetic film comprises at least one alloy selected from the group consisting of the CoP alloys represented by the following formulae, wherein X, Y, Z, a and b denote atomic percent (at %):

$$Co_xP_yPt_z$$

where Y and Z denote $4 \leq Y \leq 11$, and $2 \leq Z \leq 10$, respectively, with the balance being X;

$$Co_xP_yPt_zNi_a$$

where Y, Z and a denote $5 \leq Y \leq 9$, $2 \leq Z \leq 10$ and $5 \leq a \leq 35$, respectively, with the balance being X; and $$Co_xP_yPt_zNi_aCr_b$$

where Y, Z and a and b denote $5 \leq Y \leq 9$, $2 \leq Z \leq 10$, $5 \leq a \leq 35$ and $0 < b \leq 17$, respectively, with the balance being X.

2. A magnetic recording medium as claimed in claim 1, wherein said non-magnetic base comprises an aluminum disk and a coating of NiP plated on said aluminum disk.

* * * * *